Aug. 18, 1970  I. DICK ET AL  3,524,358
DEVICE FOR ELIMINATION OF INDICATOR WHEEL BOUNCE
Filed Feb. 26, 1969  2 Sheets-Sheet 1

INVENTORS.
IRVING DICK
LEONARD SCHWARTZMAN

ATTORNEY

Aug. 18, 1970     I. DICK ET AL     3,524,358

DEVICE FOR ELIMINATION OF INDICATOR WHEEL BOUNCE

Filed Feb. 26, 1969     2 Sheets-Sheet 2

INVENTORS.
IRVING DICK
LEONARD SCHWARTZMAN

*Albert H. Graman*

ATTORNEY

United States Patent Office 3,524,358
Patented Aug. 18, 1970

3,524,358
DEVICE FOR ELIMINATION OF
INDICATOR WHEEL BOUNCE
Irving Dick, Whitestone, and Leonard Schwartzman, Old
Bethpage, N.Y., assignors to Electrospace Corporation,
Glen Cove, N.Y., a corporation of New York
Filed Feb. 26, 1969, Ser. No. 802,492
Int. Cl. F16h 21/44; G01r 1/14; G08b 5/00
U.S. Cl. 74—98        7 Claims

ABSTRACT OF THE DISCLOSURE

A display device for indicating the condition of certain circuit operations. The device includes a rotatable indicator wheel having colored segments and coupling means to an electromagnetic operating assembly. An inertial ring mounted concentrically with the indicating wheel moves with it for all low accelerating movements. When the acceleration is high, due to high applied voltages, the inertial ring lags behind the movement of the indicator and, near the end of the travel of the ring, its motion absorbs all tendency of the wheel to bounce or flutter.

BACKGROUND OF THE INVENTION

This invention relates specifically to a means for prevention of bounce or chatter of a moving indicating means when brought to a stop point. While the device is used in connection with a rotatable indicator wheel for indicating the presence of a current pulse, it will be evident that the same principle of operation can be applied to many other types of moving indicators. Another use of the invention is to prevent flutter and bounce due to back EMF, eliminating the need for electrical device such as capacitors and diodes particularly when these devices are not compatible with the circuitry.

The main purpose of the invention is to provide satisfactory performance of a display device when subjected to voltages and currents which may vary over a wide range of values. In the example to be described, the indicator assembly is primarily driven by the interaction of a permanent magnet and an electromagnetic winding. The indicator assembly is designed to operate with a minimum of mechanical friction so that it can be actuated with a minimum of electrical power at low voltages. However, there may be times when high voltage pulses are applied to the device and the driving torque applied to the indicator is many times more than is necessary for its operation. Such a condition results in a rapid acceleration of the indicator wheel assembly which in turn causes a bounce when it reaches its final or stop position. Elimination of the bounce or chatter at high voltages has been achieved by a simple mechanical inertial ring which does not effect the operation at low voltages.

This invention is an improvement of the display device shown and described in U.S. Pat. No. 3,309,696 issued Mar. 14, 1967.

SUMMARY OF THE INVENTION

The invention comprises a rockable indicator wheel mounted on a shaft journalled in brackets secured to a base. The outer surface of the wheel is provided with indicia which can be viewed by an observer. A gear is coupled between the indicator wheel and a lever which is operated by an electromagnetic winding and a permanent magnet. An annular groove is cut in the indicator wheel and a ring having a generally oblong cross section is loosely positioned therein. When the indicator assembly is turned slowly from one position to another, the ring turns with it. When the indicator assembly is accelerated at a rapid rate, the ring at first slips in its groove, but later the friction between the ring surface and the surface of the groove causes the ring to move. When the indicator assembly is stopped abruptly, the ring continues to move and the friction between surfaces urges the indicator wheel to remain at its stop position.

DESCRIPTION OF THE DRAWINGS

For a better understanding of the present invention, together with other and further objects thereof, reference is made to the following description taken in connection with the accompanying drawings.

DESCRIPTION OF THE PREFERRED
EMBODIMENT

Figure 1:
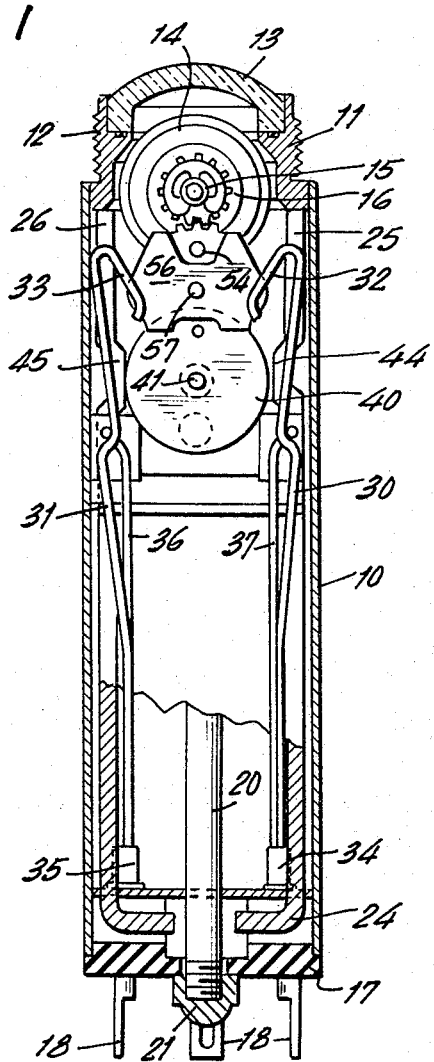
FIG. 1 is a partial cross sectional view of the display device taken generally along a vertical axis.
Figure 2:
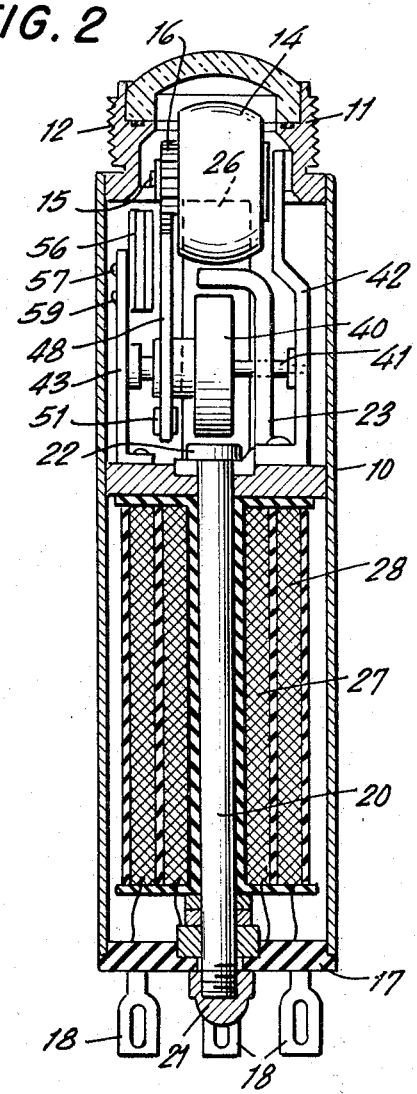
FIG. 2 is a cross sectional view similar to FIG. 1 but taken along a sectional plane at right angles to the sectional plane of FIG. 1.

Referring now to FIGS. 1 and 2, the display device comprises a metal shell 10 having a square cross section. One end of the shell is closed by a bezel 11 which is externally threaded as shown at 12 for attachment to a switch board or other panel requiring a view device. The bezel 11 supports a lens 13 which may be made of any transparent plastic such as "Lucite." Mounted adjacent to the lens 13 is an indicating means 14 which in this case has a spherical surface. However, a cylindrical surface may be used. The surface of this indicating means is for indicia which can be viewed by an operator through the lens 13. Such indicia may be letters, figures, or white and black areas which indicate the reception of current pulses by either one of two input terminal pairs. The indicating means 14 is mounted on a shaft 15 on which it rocks. A gear wheel 16 is secured to the indicating means 14 and turns it to its operating position.

The base of the display device is closed by an insulator block 17 which supports a plurality of terminal lugs 18. These lugs are connected to various components within the display device for operating it and for test purposes. Also secured at one end to the insulator block 17, and normal thereto is a ferromagnetic core 20 which is secured to the block 17 by means of a cap nut 21. The core 20 extends upwardly in axial alignment with the casing 10 and is terminated by a flanged portion 22. The flanged portion 22 also retains a U-shaped ferromagnetic pole piece 23 whose function will be described later. The bottom portion of core 20 is secured to a second U-shaped piece of ferromagnetic material 24, the ends 25, 26 of which extend upwardly beyond the length of the core 20 and terminate in contact with the bezel 11.

Core 20 is surrounded by a first electromagnetic winding 27 which is designed to create magnetic flux in the core 20, the pole piece 23, and the two pole pieces 25 and 26. The ends of this winding are connected to two of the terminals 18. Winding 27 supports a second winding 28 which may be wound directly on the top of winding 27. It is obvious that windings 27 and 28 may be mounted in a side-by-side relationship on the core. It is the purpose of these windings to generate magnetic flux of different polarities within the core and pole pieces in order to operate the indicating means and change it from one indication to another.

Two electrical contacts are mounted within the casing and are connected to terminals in the insulator base 17. Each of these contacts includes a long flexible wire 30-31 which is terminated at its upper end by a turned-over cam follower portion 32, 33. The base of these contact wires can be secured to a cylindrical mounting 34, 35. Vertical wires 30, 31 make contact with other vertical wires 36 and 37 shown in FIG. 1 in a neutral position where both contacts are closed. This position occurs only at the start of an operation. After the device is in operation one of the contacts will remain closed while the other will be open. This latter condition is shown in FIG. 7.

Figure 3:
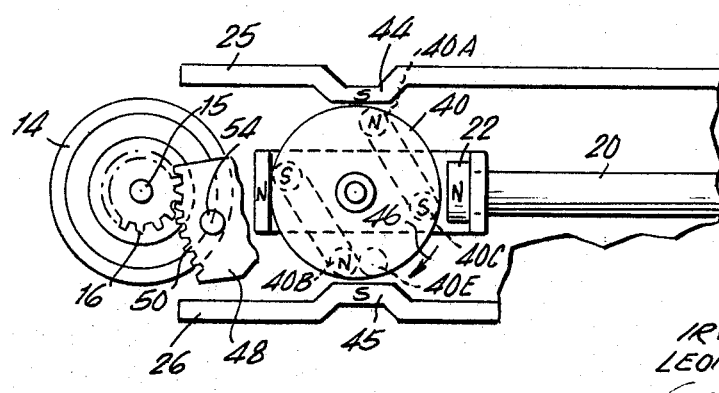
FIG. 3 is a fragmentary view, on an enlarged scale, of the device of FIGS. 1 and 2, showing the magnet, the pole pieces, the signal means, and a portion of the rockable lever. Other parts of the device have been omitted from this figure for clarity.

A permanent magnet 40 is centrally mounted above the magnetic coil and is in the form of a disk as shown in the figures. However, the disk form is a matter of convenience and two bar magnets may take the place of the disk, each bar secured to a mounting means which provides the same rockable motion as the disk. It should be noted that the permanent magnet 40 has its lower surface closely adjacent to the upper flanged portion 22 of core 20 while its upper surface is close to the upper end of the U-shaped pole piece 23. Magnet 40 is cemented to a shaft 41 which is journalled in two upright brackets 42 and 43. One of these brackets 42 rotatably supports the indicating means 14 at its upper end. As shown in FIGS. 1 and 3, the magnet 40 is mounted adjacent to portions of pole pieces 25 and 26 which are formed with inwardly offset portions 44 and 45 in order to be close to the outside surface of disk magnet 40, and to form a more definite pole position.

The enlarged view shown in FIG. 3 indicates the manner in which magnet 40 is mounted and illustrates how its magnetic poles are disposed. One north pole 40A is shown in FIG. 3 adjacent to a south pole 44 of the pole piece 25 while the second north pole 40B is shown adjacent to south pole 45 of pole piece 26. One of the south poles 40C is shown adjacent to the upper end 22 of core 20 which in this illustration is a north pole. The second south pole 40D is shown adjacent to the upper end of U-shaped pole piece 23 which is also a north pole in this example. It should be noted that the north and south poles are limited to a slight degree from moving the maximum distance to align themselves with the stationary poles. A limit lug 59, shown in FIG. 7 is secured to one of the upright brackets 43 and prevents the magnet 40 from moving to a position of minimum reluctance. This limit means is necessary to insure that, when a change of polarity is effected, the magnet will then rotate in a direction indicated by arrow 46 and the permanent south pole 40C will then assume a position denoted by the dotted circle 40E. At this time, of course, pole piece 45 will have been changed to a north pole.

Figure 7:
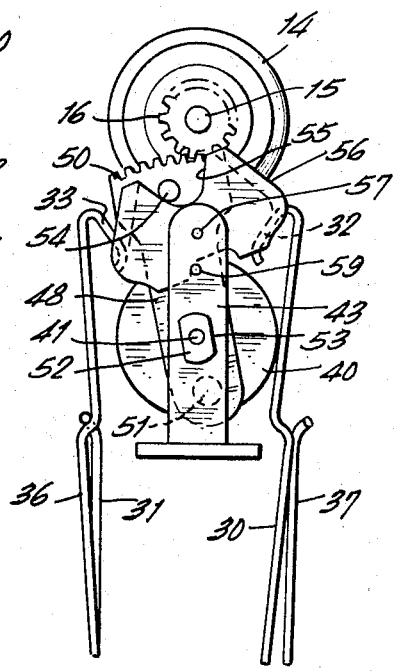
FIG. 7 is a view similar to FIG. 3 but omitting parts of the magnetic system and showing the stop means which limits the indicator wheel rotation.
Figure 8:
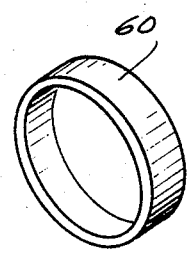
FIG. 8 is an isometric view of the inertial ring.

Referring now to FIG. 7, the magnet 40 is shown supported by bracket 43. Magnet 40 has secured thereto a lever 48 which is terminated by a gear segment 50 on one of its ends. The other end of the lever 48 may be provided with a balance weight 51 so that the device may be used in any position. Shaft 41 which supports the magnet contains a non-circular shoulder 52 formed with two flat portions 53. These flat portions engage the lever 48 and move it whenever the magnet 40 is moved. The portion of the lever close to the gear teeth is provided with a cam pin 54 for engaging a cut-out portion 55 of a coupling cam 56. The coupling cam is rockable about an axial shaft 57 supported by bracket 43 and is designed to cam the upper ends 32 and 33 of the contact wires 30 and 31 to open and close the contacts in response to the movement of the magnet. In order to insure that the ends 32, 33 of contact springs 36, 37 are always in place, the edges of the coupling cam 56 are formed with peripheral grooves in which the ends slide when the cam is rocked. FIG. 7 shows the lever 48 in one operative position with cam pin 54 in contact with cam surface 55. In this position the upper end of contact spring 36 makes contact with the end of spring 31 while spring 30 has been moved away from the upper contact point of spring 37. As soon as a current pulse actuates one of the windings and rotates magnet 40 together with lever 48 to the other position, cam pin 54 makes contact with the opposite side of cam face 55, closing the contacts between springs 30 and 37, and opening the contacts between springs 31 and 36.

It should be noted that the contact between wires 30 and 37 (see FIG. 7) is broken before the contact between wires 31 and 36 is closed. Also, the inertia stored in lever 48 when its cam pin 54 is moved from one of the faces 55 to the other, is sufficient to rock the coupling cam 56 against the tension of springs 30 and 36. It is evident from FIG. 4 that the spring terminal 32 fits into a groove in the edge of the coupling cam and provides a resilient locking action. The spring end 36 provided a similar retaining action since it must be moved away from the cam 56 when the cam is first rocked to a new position.

Figure 4:
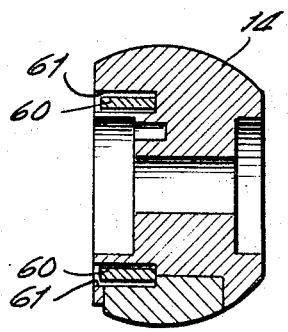
FIG. 4 is a cross sectional view of the indicator wheel showing the inertial ring and the annular groove which supports it.
Figure 5:
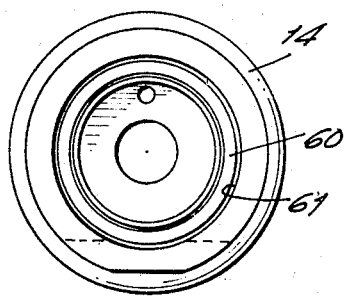
FIG. 5 is a side view of the indicator wheel shown in FIG. 4.
Figure 6:
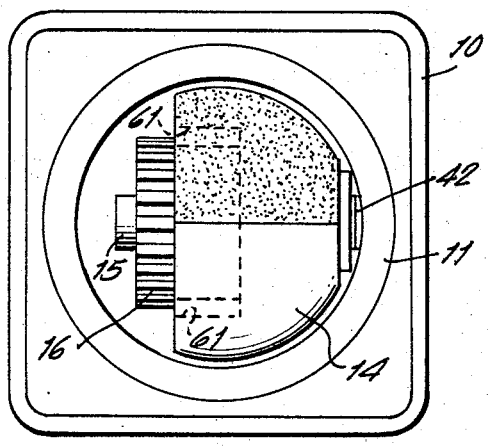
FIG. 6 is an end view of the display device.

FIGS. 4 and 5 show the indicator assembly 14 with an inertial ring 60 positioned in an annual slot 61. The indicator 14 may be made of aluminum or plastic while the ring 60 is preferably made of brass or some other high density non-magnetic material. The ring 60 fits loosely in the slot 61 and is held in place by the gear 16, not shown in FIGS. 4 or 5. Friction between the inertial ring surface and the indicator can be effected either on the inner surface of the ring or the outer surface of the ring depending upon the clearance dimensions chosen. This friction is sufficient to move the ring along with the indicator assembly when the assembly is moved at its normal velocity. However, when a high voltage pulse is applied to winding 27 or 28, the higher acceleration of the indicator caused the ring to slip in its slot at the start of the movement. As the movement of the indicator wheel progresses, the friction sets the ring into motion and, when the indicator wheel assembly 14 and 50 limits against stops 54 and 59, the ring 60 keeps on turning. This action restrains the indicator from bouncing away from its limit stops and results in a more definite indication.

Having thus fully described the invention, what is claimed as new and described to be secured by Letters Patent of the United States, is:

1. A device for the elimination of bounce in a rockable indicator means comprising; a cylindrical wheel for supporting indicating indicia on its surface, including a shaft about which the wheel turns, said wheel formed with an annular slot positioned in axial alignment with the shaft, a ring positioned within the slot and free to turn therein, and coupling means between the wheel and a rocking means for moving the wheel when a signal is to be changed.

2. A device according to claim 1 wherein the ring is formed with a cylindrical inner surface and is supported by an annular slot having a similar surface.

3. A device according to claim 1 wherein the ring is metal.

4. A device according to claim 1 wherein the coupling means is mechanical and includes a gear and gear segment.

5. A device according to claim 1 wherein the rocking means includes an electromagnetic winding and a permanent magnet.

6. A device according to claim 1 wherein said cylindrical wheel is provided with limit means for limiting its range of movement.

7. A device according to claim 1 wherein both the cylindrical wheel and the ring are made of non-magnetic materials.

References Cited

UNITED STATES PATENTS

| 2,636,399 | 4/1953 | O'Connor | 74—574 |
| 2,800,026 | 7/1957 | Kurzina | 74—7 |
| 2,838,955 | 6/1958 | Burch | 74—574 |
| 3,309,969 | 3/1967 | Alster et al. | 340—373 |

LEONARD H. GERIN, Primary Examiner

U.S. Cl. X.R.

74—432; 324—102, 103, 125; 340—373